(12) United States Patent
Bastiani et al.

(10) Patent No.: US 11,877,359 B1
(45) Date of Patent: Jan. 16, 2024

(54) PORTABLE AIRCRAFT LANDING ZONE LIGHTING APPARATUS AND SYSTEM

(71) Applicant: HYPERSPEAR LLC, Weston,, FL (US)

(72) Inventors: Sergio Bastiani, Weston,, FL (US); Pablo Gonzalez, Weston,, FL (US)

(73) Assignee: HYPERSPEAR LLC, Weston, FL (US)

( * ) Notice: Subject to any disclaimer, the term of this patent is extended or adjusted under 35 U.S.C. 154(b) by 0 days.

(21) Appl. No.: 18/311,761

(22) Filed: May 3, 2023

(51) Int. Cl.
*F21L 4/00* (2006.01)
*H05B 45/10* (2020.01)
*H04W 4/30* (2018.01)
*H05B 47/19* (2020.01)
*F21Y 115/10* (2016.01)

(52) U.S. Cl.
CPC ............... *H05B 45/10* (2020.01); *F21L 4/00* (2013.01); *H04W 4/30* (2018.02); *H05B 47/19* (2020.01); *F21Y 2115/10* (2016.08)

(58) Field of Classification Search
CPC .............................. F21L 4/00; F21Y 2115/10
See application file for complete search history.

(56) References Cited

U.S. PATENT DOCUMENTS

| | | | | |
|---|---|---|---|---|
| 7,201,490 | B1* | 4/2007 | Bieberdorf | B64F 1/20 362/362 |
| 9,457,916 | B2 | 10/2016 | McDermott | |
| 2005/0110649 | A1* | 5/2005 | Fredericks | B64D 47/06 340/815.45 |
| 2009/0115336 | A1* | 5/2009 | Wang | H05B 45/3577 315/136 |
| 2011/0121734 | A1* | 5/2011 | Pape | B64F 1/20 315/86 |
| 2016/0374173 | A1* | 12/2016 | Vidal | H05B 47/18 |
| 2018/0332692 | A1* | 11/2018 | Feil | H04W 12/02 |

OTHER PUBLICATIONS

Company: Phantom Products, Inc.; Product: Phantom AZL-15 5 Color Light; WEBSITE: https://phantomlights.com/phantom-azl-15-5-color-light-most-popular/ ; Published: Aug. 8, 2020 (according to Internet Archive (https:web.archive.org).
Company: Adventure Lights; Product: VIP/VIPIR; Website: http://www.nitevis.com/ADV_VIP_Original.htm ; Published: Feb. 16, 2016 (according to Internet Archive (https:web.archive.org).

* cited by examiner

*Primary Examiner* — Evan P Dzierzynski
(74) *Attorney, Agent, or Firm* — Kenyon Jenckes

(57) ABSTRACT

Lightweight and man-portable lights may be used to provide a rapid and deployable aircraft landing zone illumination solution. The lights may produce a combination of visible and infrared (IR) light. The lights may be mounted using stakes or concrete anchors, or they can be left unmounted on the ground for easy and rapid deployment. The light may include five types of visible light-emitting diodes (LEDs)— white (W), yellow (Y), green (G), red (R), and blue (B)— and infrared (IR) LEDs. The LEDs (visible and IR) can be controllable between different intensities. The light may include built-in wireless communication capabilities. A number of lights may be positioned and then operated together for landing zone and emergency lighting solutions.

16 Claims, 13 Drawing Sheets

500

| COLOR | INTENSITY (Cd) AVG |
|---|---|
| White | 20.0 |
| Green | 9.5 |
| Red | 5.5 |
| Blue | 3.5 |
| Yellow | 9.5 |
| IR | $1.15 \times 10^{-2}$ W/Sr |

FIG. 5

PORTABLE AIRCRAFT LANDING ZONE LIGHTING APPARATUS AND SYSTEM

TECHNICAL FIELD

The technical field of the disclosed embodiments relate to aircraft landing zone lighting systems. More particularly, the disclosed embodiments relate to portable and/or temporary remote-controllable aircraft landing zone lights.

BACKGROUND

Rapid deployment landing zones (RDZs) are temporary landing areas that are set up in remote or austere locations. They are typically used by aerial vehicles such as military helicopters to quickly and safely land and take off, and may also be used for emergency medical evacuations.

Once a location for an RDZ has been selected and cleared, it must be marked so that pilots can easily see the landing zone. Landing zone operational lights (LZOLs) provide pilots with a clear visual indication of the landing zone, even in low-light or no-light conditions. This can help to improve safety and reduce the risk of accidents.

Existing LZOLs may be heavy and bulky, making them difficult to transport to remote or austere locations. They are often expensive, and can be difficult to set up and use, which can add to the time and expense of deploying them.

SUMMARY

In an embodiment, a number of lightweight and man-portable lights may be used to provide a rapid and deployable aircraft landing zone illumination solution. The lights may produce a combination of visible and infrared (IR) omnidirectional light. The lights may be mounted using stakes or concrete anchors, or they can be left unmounted on the ground for easy and rapid deployment.

The light may include a housing with a circular lighting shelf including visible color and IR light-emitting diodes (LEDs). A transparent cover protects electrical/electronic components in the housing. A cylindrical reflector internal to the circle of LEDs in the housing may be used to direct and focus light from the LEDs outside of the housing. The base includes mounting holes.

In an embodiment, the light may include five types of visible light-emitting diodes (LEDs)—white (W), yellow (Y), green (G), red (R), and blue (B)—and infrared (IR) LEDs (e.g., 840-940 nm) distributed around the lighting ring. Each LED (visible and IR) may be controllable between multiple different intensities, for example, low, medium, and high. However, any set of intensities within the capability of the LEDs may be used.

The high intensity mode for the visible LEDs may meet the requirements of the NATO STANAG (Standardization Agreement) and/or the requirements of the FAA AC (Federal Aviation Administration Advisory Circular) 150/5345-50B—Specification for Portable Runway and Taxiway Lights. The IR LEDs may be night vision device (NVD) compatible lighting systems and meet the requirements of NAVAIR (Naval Air Systems Command) EAF (Engineering and Acquisition Framework) UFC360 (Unified Facilities Criteria, 360 degrees) and UFC-3-260-1. The LEDs can be operated in multiple modes including: steady-on or flashing.

The light may include built-in wireless communication capabilities. The light may include a wireless modem and an internal antenna. The wireless communication may be encrypted, e.g., AES (Advanced Encryption Standard) 127-Bit Encryption. Each light may act as a repeater, relaying the signal to another light further away.

The light may receive control signals wirelessly from a remote controller via an internal antenna and modem.

The light includes a controller with associated memory that manages various functions in response to user commands through input devices on the housing or transmitted via the remote controller.

The light may have a "leave-behind" functionality that allows the light to be disabled remotely.

The various components in the lights (LEDs, controller, modem, etc.) can be powered by a replaceable and/or rechargeable internal batteries in a battery compartment.

BRIEF DESCRIPTION OF THE DRAWINGS

FIG. 5 is a table showing the minimum acquisition statute mile and peak average intensity for the various color LEDs (light emitting diodes) and IR LEDs in an aircraft landing zone light according to an embodiment.

DETAILED DESCRIPTION

Figure 1:
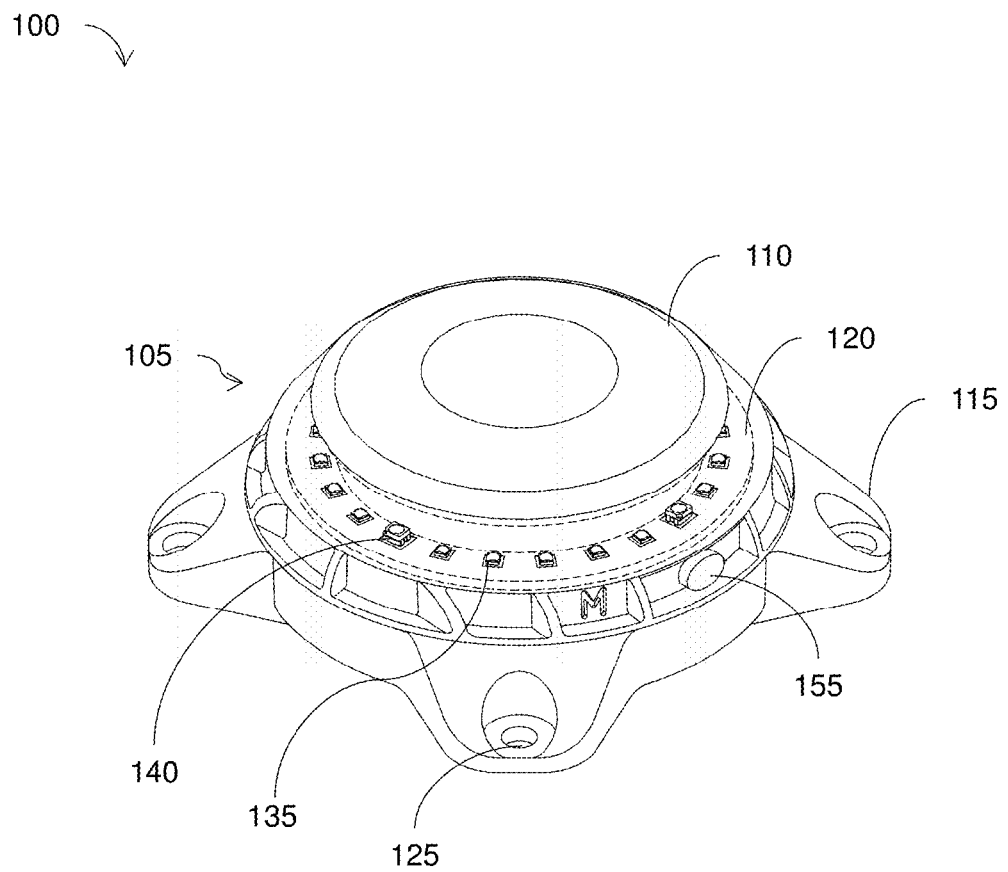
FIG. 1 is a perspective view of a portable, temporary aircraft landing zone light according to an embodiment.
Figure 2:
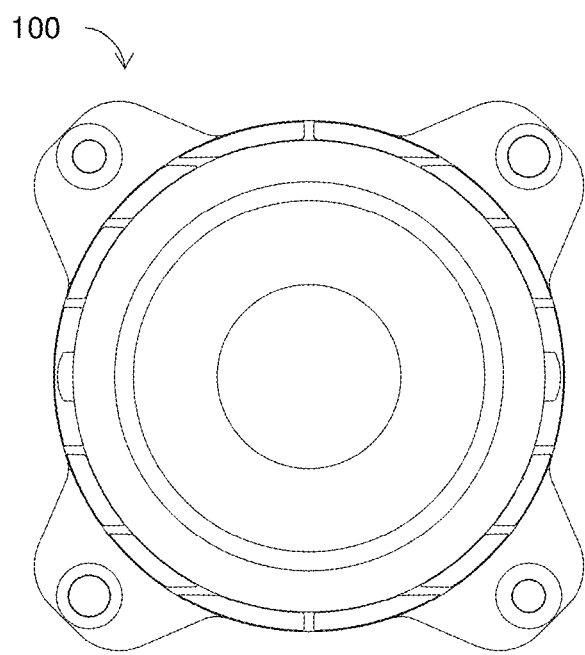
FIG. 2 is a plan view of the aircraft landing zone light of FIG. 1.
Figure 3:
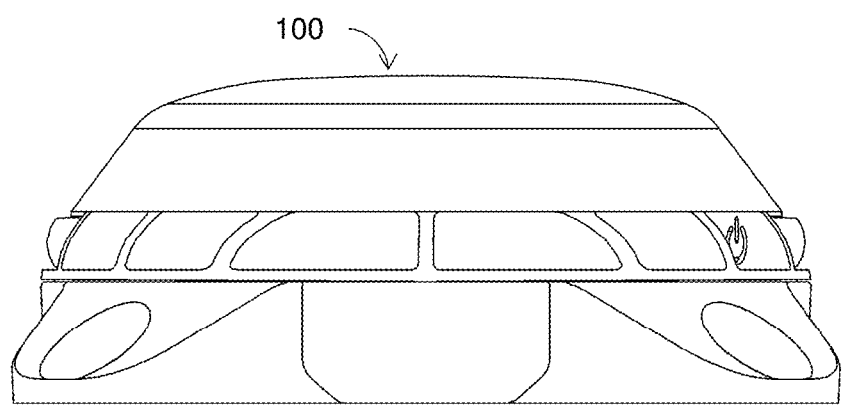
FIG. 3 is an elevation view of the aircraft landing zone light of FIG. 1.

In an embodiment, a number of lightweight and man-portable lights may be used to provide a rapid and deployable aircraft landing zone illumination solution. The lights may produce a combination of visible color and infrared (IR) light. The lights may be mounted using stakes or concrete anchors, or they can be left unmounted on the ground for easy and rapid deployment.

The lights are easy to transport and set up, and they are visible to both pilots and ground personnel. They are a rapid and deployable aircraft landing zone illumination solution, making them ideal for use in a variety of situations. The aircraft landing zone may be, for example, a helipad, RDZ, runway, flight deck, etc.

FIGS. 1-4 show a portable aircraft landing zone light 100 according to an embodiment. The light 100 includes a circular housing 105, a transparent cover 110, and a base 115. The housing 105 may include a lighting ring, or shelf, 120 including a number of light-emitting diodes (LEDs) or other solid-state illumination sources, and internal electrical/electronic components. A reflecting ring 145 internal to the lighting ring may direct and focus light from the LEDs. The transparent cover may protect the components in the housing 105. The transparent 110 cover may be made from a clear plastic, e.g., a UV-stabilized high-impact polycarbonate. The base 115 may include mounting holes 125 to accept mounting hardware, e.g., screws, anchors, stakes, zip ties, etc. Although the housing 105 is described as circular, other shapes may be used.

Figure 4:
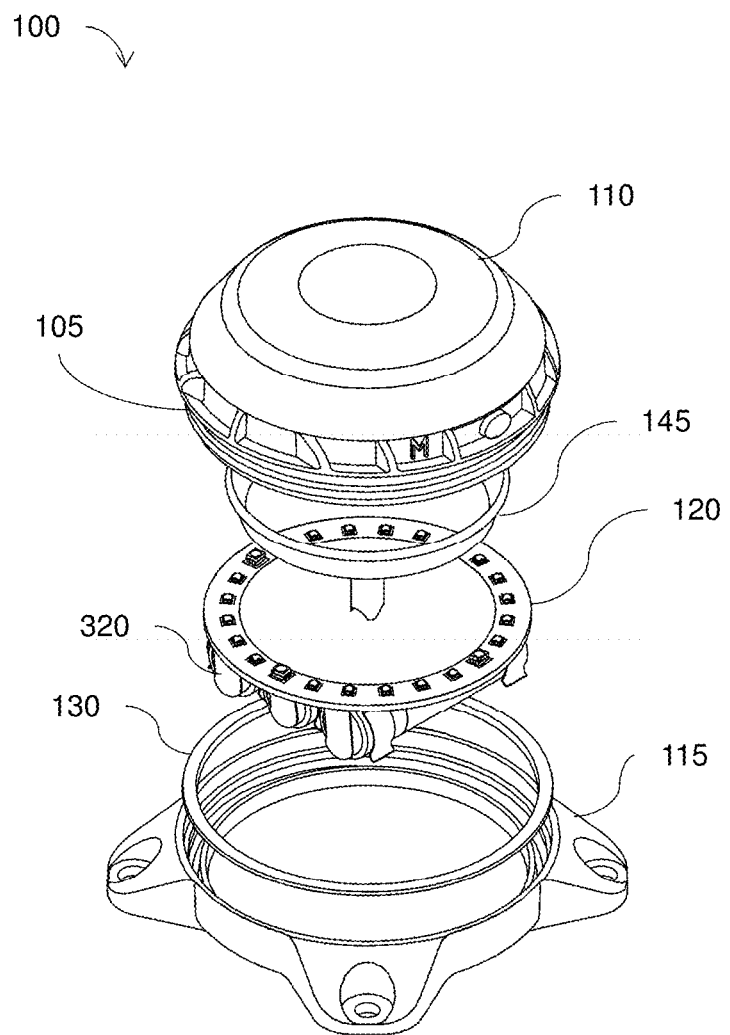
FIG. 4 is an exploded view of the aircraft landing zone light of FIG. 1.

As shown in FIG. 4, An O-ring 130 can be placed around the housing 105, and then the housing can be screwed into place onto the base 115. The threaded mating portions of the base and housing may create a watertight seal. The threaded mating portions also allow the base 115 to be exchanged with another type of base, for example a base including solar panels to collect solar energy to (re)charge the batteries 320.

In an embodiment, the light may include five types of visible light-emitting diodes (LEDs) 135—white (W), yellow (Y), green (G), red (R), and blue (B)—and IR LEDs 140 (e.g., 840-940 nm) distributed around the lighting ring 120. Each LED (visible and IR) may be controllable between multiple different intensities, for example, low, medium, and high. The high intensity mode for the visible LEDs 135 may meet the requirements of the NATO STANAG (Standardization Agreement) Heliport Marking and Lighting standard, a military standard that specifies the requirements for the marking and lighting of helicopter landing zones and Federal Aviation Agency (FAA) AC 150/5345-50B—Specification for Portable Runway and Taxiway Lights, a commercial standard that specifies the requirements for the marking and lighting of portable airfields. The IR LEDs 140 may be night vision device (NVD) compatible lighting systems, e.g., compatible with military Class B and C NVG goggles. The intensities may meet the requirements of NAVAIR (Naval Air Systems Command) EAF (Engineering and Acquisition Framework) UFC360 (Unified Facilities Criteria, 360 degrees) and UFC-3-260-1. These standards have requirements for IR lighting systems to ensure that they are safe, reliable, and effective. The LEDs can be operated in multiple modes including: steady-on or flashing.

Figure 6A:
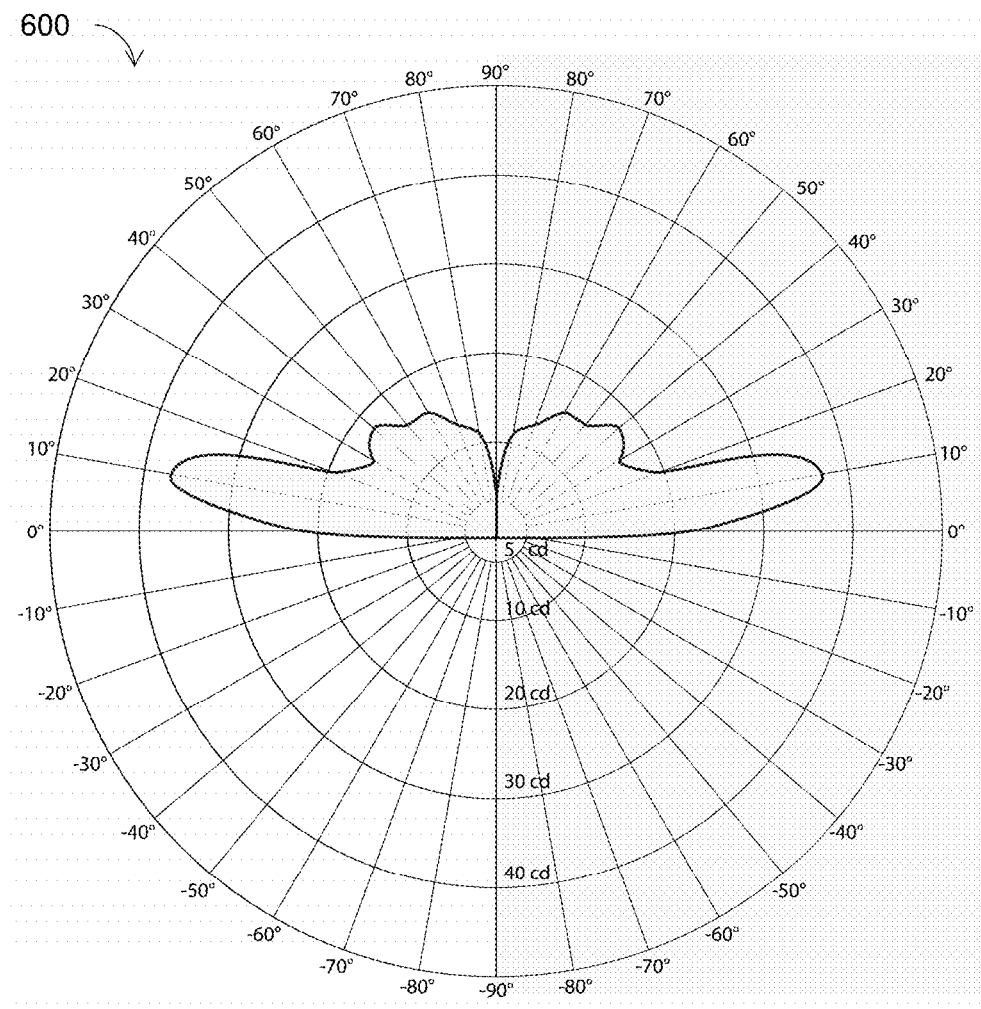
FIG. 6A is a chart showing the emitting distribution of the visible LEDs and IR LEDs in relation to the viewing angle in an aircraft landing zone light according to an embodiment.
Figure 6B:
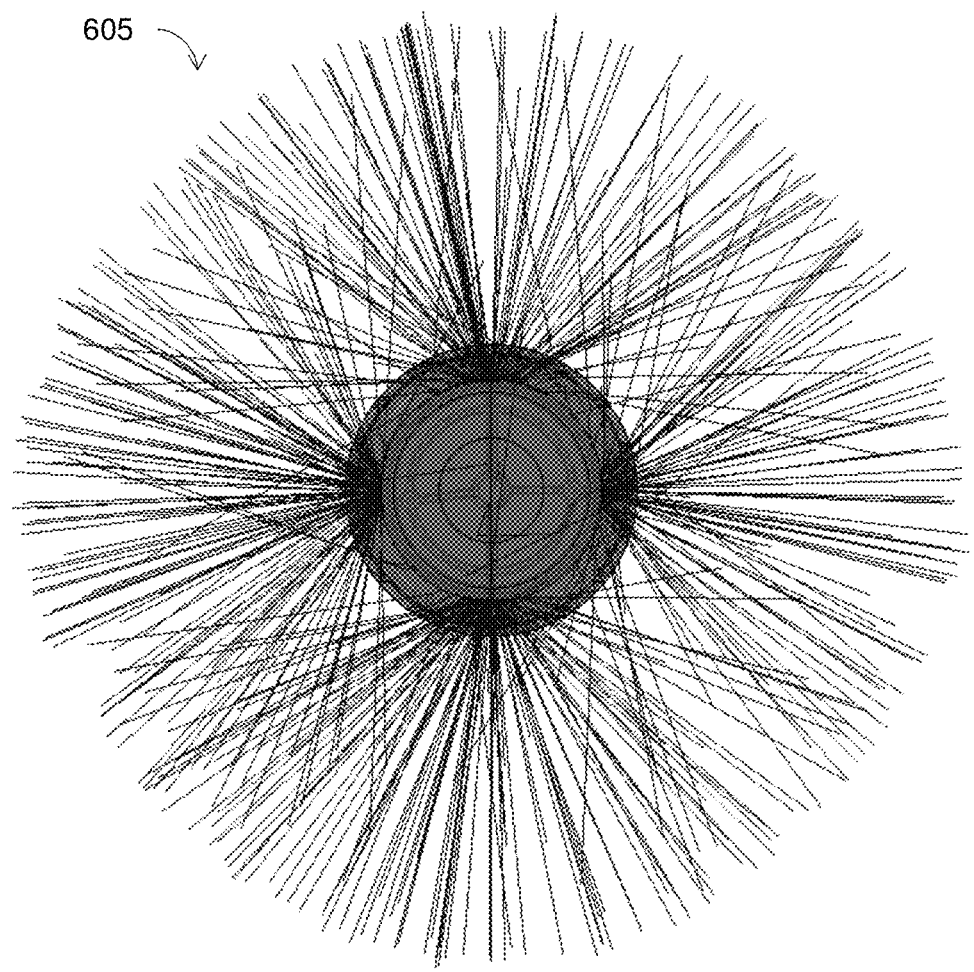
FIG. 6B is a plan view of the aircraft landing zone light showing an omnidirectional illumination pattern.
Figure 6C:
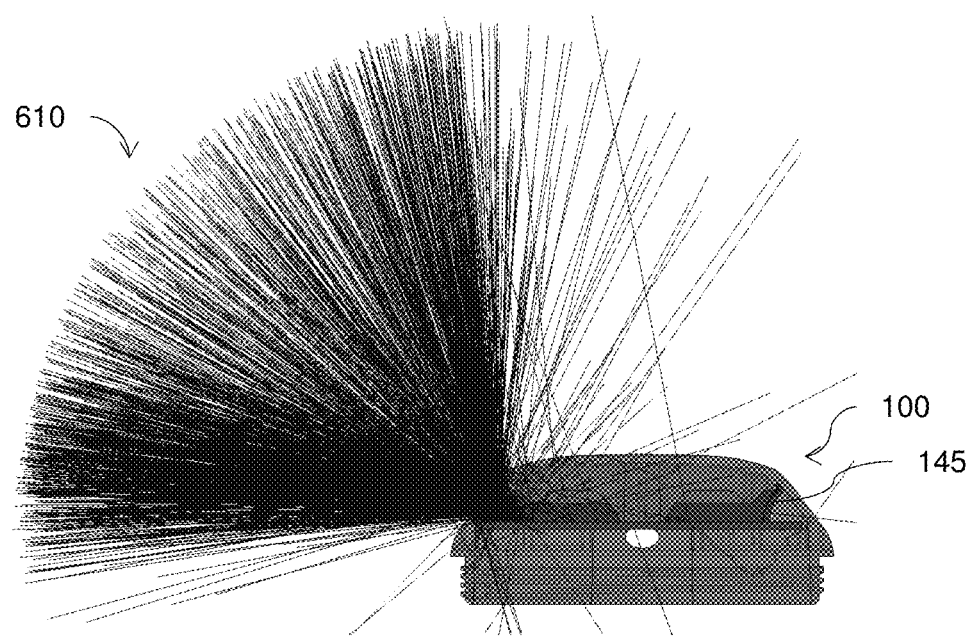
FIG. 6C is an elevation view of the aircraft landing zone light showing a half hemispherical illumination pattern.

FIG. 5 illustrate the intensity and acquisition distance of the various LEDs. FIG. 5 is a table 500 showing the minimum average intensity for the various color LEDs and IR LEDs in an aircraft landing zone light according to an embodiment. FIG. 6A shows the emitting distribution 600 of both the visible LEDs and the IR LEDs in relation to the viewing angle. As shown in FIG. 6B, emitting light is omnidirectional 605, providing the main beam pattern from −5 degrees to 15 degrees vertical. Light is also emitted from 15 degrees up to 90 degrees creating a full half hemisphere pattern 610 (FIG. 6C).

The light 100 may include built-in wireless communication capabilities. The light may include a wireless modem and an internal antenna. The wireless communication may be encrypted, e.g., AES (Advanced Encryption Standard) 127-Bit Encryption. Each light 100 may also act as a repeater, relaying the signal to another light further away, increasing the total distance that a control signal can travel well above that of an individual light.

Figure 7:
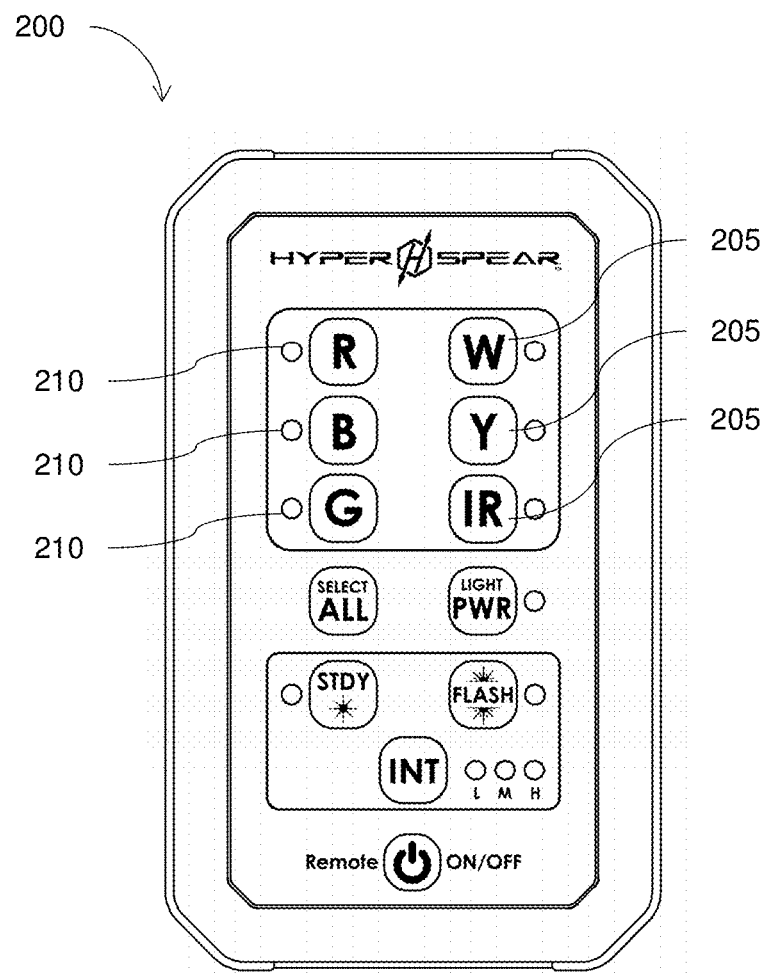
FIG. 7 is a plan view of a remote controller according to an embodiment.

The light 100 may receive control signals wirelessly from a remote controller 200, such as that as shown in FIG. 7. The remote controller 200 may include a user interface, e.g., buttons, switches, etc., to select specific, or all, color/IR LEDs, control light intensity, select between modes, power on/off, etc. Indicator lights 210 may be provided to show which features are active.

A user may use the remote controller 200 to switch from visible light to IR for immediate covert operation, and back again. The remote controller 200 may be linked to more than one light, either directly, or by slaving other light(s) to a master light, enabling the user to control a number of lights simultaneously with the remote controller 200 through the wireless connection.

The light may have a "leave-behind" functionality that allows the light (and all slaved lights) to be disabled remotely if it is left behind enemy lines. This renders the light(s) inoperable, or "bricked."

Figure 8:
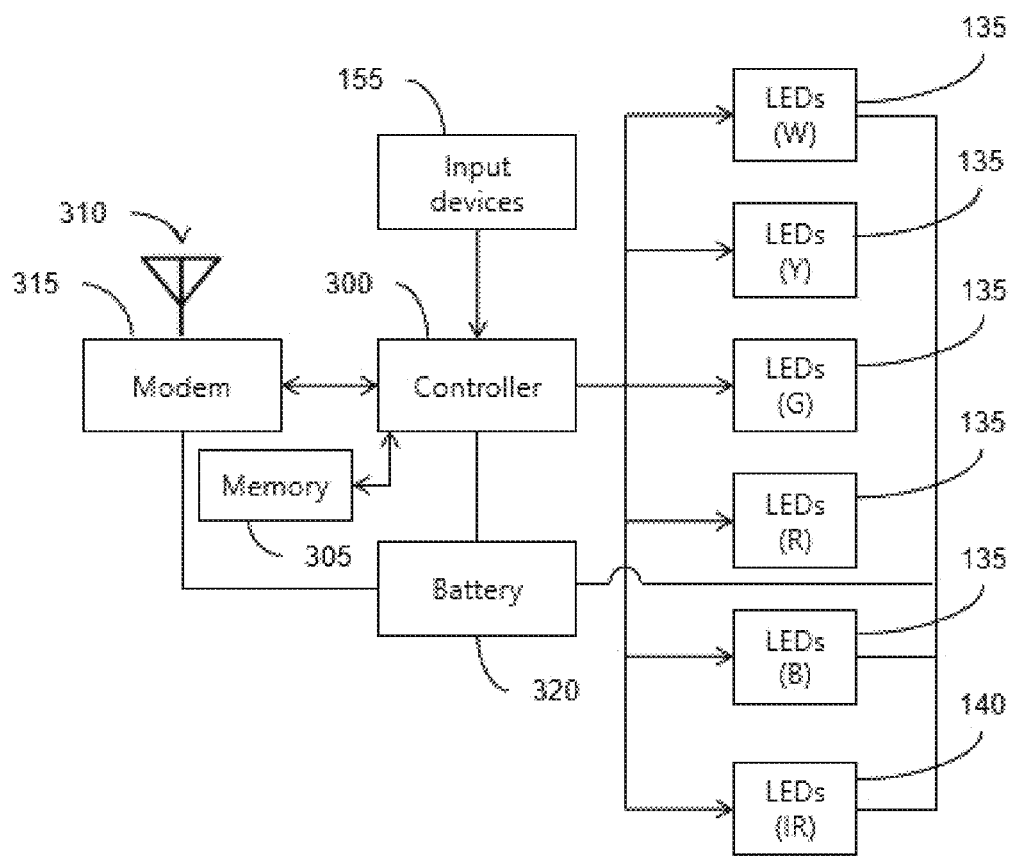
FIG. 8 is a block diagram of internal components in an aircraft landing zone light according to an embodiment.

FIG. 8 is a diagram of internal components of the light according to an embodiment. A controller 300 can manage various functions in response to user commands through input devices 155 (e.g., buttons, switches, etc.) on the housing or through the remote controller 200. The controller 300 may be, for example, a programmable logic controller (PLC), microcontroller, or other type of programmable processor. The controller 300 may include internal and/or external memory 305.

The user may control basic functions of the light through the input devices 155 on the housing, for example, power on/off, wireless pairing, etc. The user may control selected LEDs to energize at a chosen intensity and mode using the remote controller 200. The controller receives wireless signals from the remote controller 200 via an internal antenna 310. The signals are decoded by a modem 315, and the controller controls the LEDs 135, 140 and other functions (e.g., power on/off, wireless pairing, "brick", etc.) based on the received command(s). The various components in the lights (LEDs, controller, modem, etc.) can be powered by a replaceable and/or rechargeable internal battery(-ies) 320, e.g., alkaline, lithium-ion, nickel cadmium, etc. The batteries may be accessible in the bottom of the housing, and may be accessed manually (tool-less entry).

Figure 9:
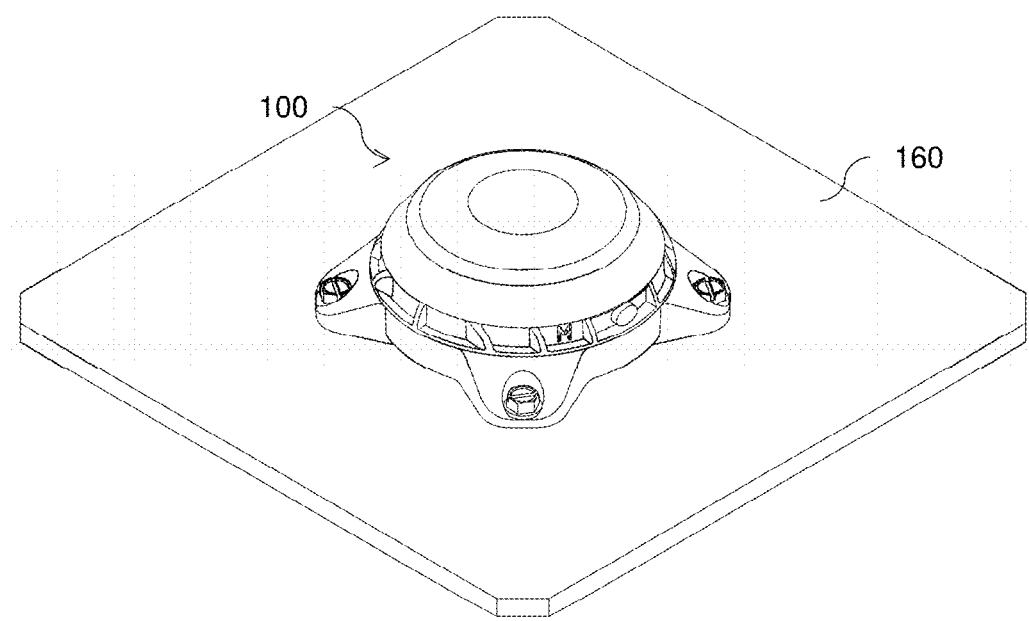
FIG. 9 is a perspective view showing an aircraft landing zone light attached to a mounting plate according to an embodiment.

The base 115 may be made from a rigid, chemical- and UV-stabilized high-tech polymer, e.g., polycarbonate, polyurethane, HDPE (high-density polyethylene), UHMWPE (Ultra-high molecular weight polyethylene), etc. The base may include mounting holes 125 for two ¼" concrete anchors and/or two 3/16" stakes, as well as tie wraps. The base may be mounted to an anchor plate (e.g., weighted steel plate) to secure the light in position, as shown in FIG. 9.

As described above, the light 100 may be designed to be rugged, self-contained, and lightweight for easy portability. In an embodiment, the light may be about 90 mm (L)×90 mm (W)×36 mm (H), and weight about 80 grams (150 grams with batteries). The light 100 may be made of rugged, impact-resistant materials, and may be powered by rechargeable and/or commercial off the shelf standard replaceable batteries. The light 100 may be water-resistant, dust-proof, and impact-resistant.

Figure 10:
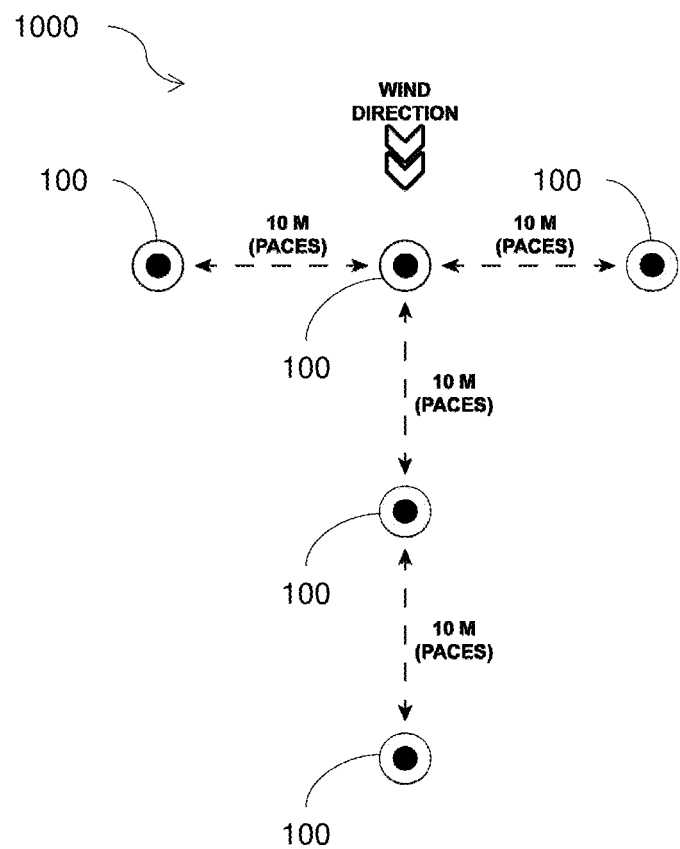
FIG. 10 shows a NATO "T" landing zone diagram for an aircraft landing zone lighting system according to an embodiment.
Figure 11:
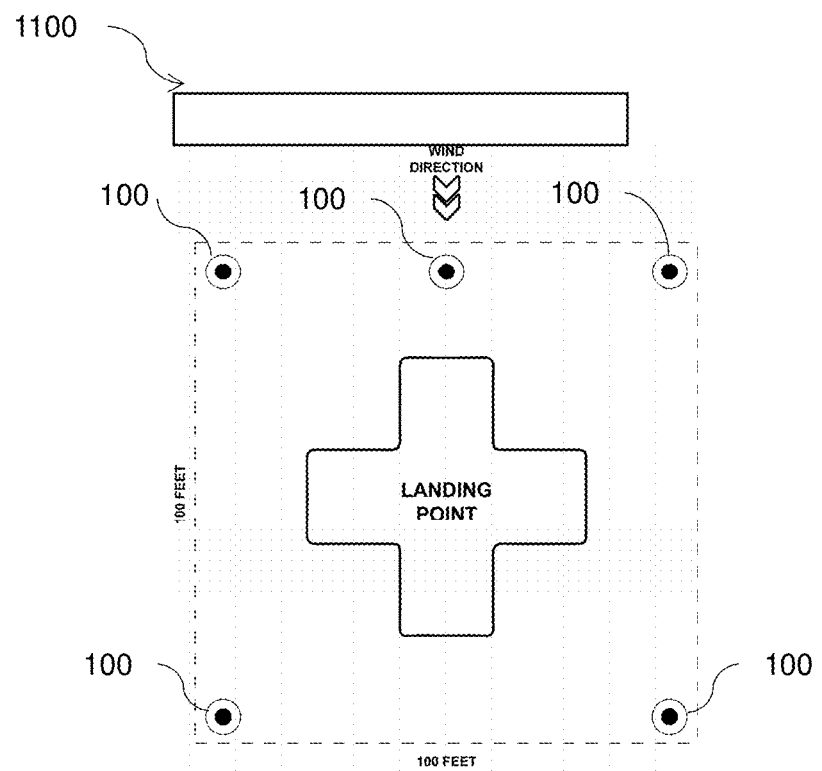
FIG. 11 shows a box-type landing zone diagram for an aircraft landing zone lighting system according to an embodiment.
Figure 12:
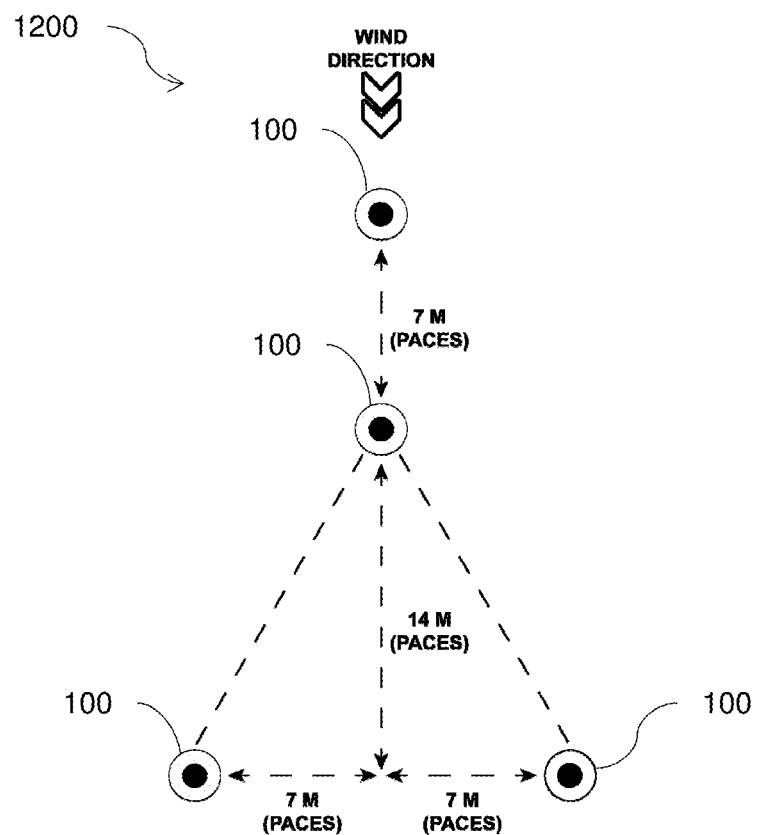
FIG. 12 shows an inverse "Y" landing zone diagram for an aircraft landing zone lighting system according to an embodiment.

FIGS. 10-12 show different use cases for an aircraft landing zone lighting system including multiple lights paired with one or more remote controllers 200.

For example, the lights 100 can be used in the NATO "T" landing zone configuration described in NATO STANAG. This lighting system consists of a series of lights that are arranged in a "T" shape 1000, as shown in FIG. 10. The lights may emit omnidirectional white visible color, or can be set to IR for covert mode.

The NATO "T" landing zone configuration provide pilots with a clear and unambiguous visual cue of the landing zone alignment. The lights are arranged in a way that makes it easy for pilots to see the landing zone, even in low-visibility conditions. The system is also designed to be compatible with night vision goggles.

FIG. 11 shows a landing zone lighting configuration in which the lights 100 are arranged in a box pattern 1100. The lights on the corners 1005 are set to red, and a light in the front center 1100 of the box is set to yellow, with the front of the box oriented in the direction of the wind. FIG. 12 shows an inverted "Y" landing zone pattern 1200, in which the lights may emit omnidirectional white light, or be set to IR for covert mode.

The portable aircraft landing zone lighting system is a versatile and effective tool that can be used in a variety of situations to improve safety and efficiency. It can be used as an RDZ kit for operational landing of helicopters (military and rescue), as a rapid deployment landing kit for UAV (Unmanned Aerial Vehicle) operation, as a temporary aircraft landing zone lighting system when power goes out in an airport, as a helicopter shipboard lighting system used permanently on shipboard helipads, and as CBRN (Chemical, Biological, Radiological, and Nuclear) emergency lighting used to direct people away from danger in low light conditions.

The portable aircraft landing zone lighting system is easy to set up and use. The individual lights 100 are lightweight and portable, making them ideal for use in a variety of different locations. It may also provide a cost-effective solution for a variety of needs.

The foregoing method descriptions and figures are provided as illustrative examples only. The order of operations in the aspects described herein may be performed in any order. Words such as "thereafter," "then," "next," etc. are used to guide the reader through the description of the methods and systems described herein, and do not limit the order of the operations. Any reference to claim elements in the singular, for example, using the articles "a," "an," or "the" is not to be construed as limiting the element to the singular. Also, relative terms such as "top," "bottom," "upper," "lower," "above," "below," and the like as used herein describe the relative positions of elements or features, and are not limited to the orientations depicted in the drawings. Furthermore, the specific dimensions and other details set forth with regard to specific embodiments are for illustrative purposes only and are not intended to limit the scope of the claims.

The components, blocks, modules, circuits, operations, etc. described may be implemented in hardware, software, firmware, or any combination thereof. Hardware implementation may include, for example, one or more application-specific integrated circuits (ASICs), field-programmable gate arrays (FPGAs), or other programmable logic devices. Software implementation may include, for example, one or more computer programs, firmware, or other executable code. Firmware implementation may include, for example, one or more programs or code that is stored in a non-volatile memory, such as a read-only memory (ROM), a flash memory, or an erasable programmable read-only memory (EPROM).

If implemented in software, the operations may be stored as one or more instructions (or code) on a non-transitory computer-readable storage medium or a non-transitory processor-readable storage medium. A non-transitory computer-readable storage medium may include, for example, a hard disk drive, a solid-state drive, a flash memory, a memory card, a CD-ROM, a DVD, etc.

The operations of a method or algorithm disclosed herein may be embodied in a processor-executable software module or as processor-executable instructions, both of which may reside on a non-transitory computer-readable or processor-readable storage medium. A processor-executable software module may include, for example, a computer program, a firmware, or other executable code that is executed by a processor. Processor-executable instructions may include, for example, one or more instructions that are executed by a processor.

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the specific embodiments described herein but is to be accorded the widest scope consistent with the claims.

The invention claimed is:

1. A portable light comprising:
   a housing including
      a lighting shelf including a plurality of illumination sources including visible light emitting illumination sources and infrared (IR) emitting illumination sources,
      an interior cylindrical reflector including a plurality of curvatures to focus light from the illumination sources in a hemispherical illumination pattern,
      an antenna,
      a modem connected to the antenna,
      a controller connected to the modem and the plurality of illumination sources,
      a non-transitory memory storing instructions that, when executed by the controller, cause the controller to
         wirelessly pair with a remote controller via the modem,
         wirelessly pair with another portable light via the modem,
         select one or more illumination sources in response to a user command received from the remote controller via the modem, and
      a battery compartment electrically connected to the modem, the controller, and the plurality of illumination sources;
   a transparent cover covering the lighting shelf; and
   a base attached to the housing.

2. The portable light of claim 1, wherein the housing further comprises one or more input devices.

3. The portable light of claim 1, wherein the illumination sources comprise light-emitting diodes (LEDs).

4. The portable light of claim 1, wherein the plurality of visible light emitting sources emit light in wavelengths corresponding to colors selected from white, yellow, green, red, and blue.

5. The portable light of claim 1, wherein the plurality of IR light emitting sources emit IR in the 840-940 nm range compatible with night vision devices.

6. The portable light of claim 1, wherein the memory further stores instructions that, when executed by the controller, cause the controller to cause the selected illumination sources to emit light at an intensity selected from a plurality of available intensities.

7. The portable light of claim 1, wherein the memory further stores instructions that, when executed by the controller, cause the controller to render the light inoperable.

8. The portable light of claim 1, wherein the memory further stores instructions that, when executed by the controller, cause the controller to cause the selected illumination sources to emit light in compliance with at least one of NATO STANAG (Standardization Agreement), NAVAIR (Naval Air Systems Command) EAF (Engineering and Acquisition Framework) UFC360 (Unified Facilities Criteria, 360 degrees), UFC-3-260-1, and FAA AC Federal Aviation Administration Advisory Circular) 150/5345-50B.

9. The portable light of claim 1, wherein the modem is configured to transmit and receive encrypted wireless signals.

10. The portable light of claim 1, wherein the modem is configured to transmit and receive encrypted wireless signals according to AES (Advanced Encryption Standard) 127-Bit Encryption.

11. The portable light of claim 1, wherein the memory further stores instructions that, when executed by the controller, cause the controller to cause the selected illumination sources to emit light in one of a selected steady-on mode and a flashing mode.

12. The portable light of claim 1, further comprising an interior cylindrical reflector including a plurality of curvatures to focus light from the illumination sources in an omnidirectional outwards direction.

13. The portable light of claim 1, wherein the interior cylindrical reflector focuses a majority of the light from 0 degrees to 15 degrees.

14. The portable light of claim 1, wherein the base includes a plurality of mounting holes.

15. The portable light of claim 1, wherein the base and the housing include matching threading adapted to enable exchanging the base with another base.

16. The portable light of claim 1, wherein the base includes solar panels.

\* \* \* \* \*